United States Patent [19]
Garrett et al.

[11] Patent Number: 4,780,383
[45] Date of Patent: Oct. 25, 1988

[54] OPTICAL STORAGE SYSTEM HAVING EXPANDED CAPACITY

[75] Inventors: Thomas B. Garrett, Warwick Township, Lancaster County; Lynn M. Reslewic, West Earl Township, Lancaster County; James A. Tshudy, Ephrata Township, Lancaster County, all of Pa.

[73] Assignee: Armstrong World Industries, Inc., Lancaster, Pa.

[21] Appl. No.: 706,119

[22] Filed: Feb. 27, 1985

[51] Int. Cl.$^4$ .................... G02F 1/03; C09K 19/00
[52] U.S. Cl. ........................................ 430/11; 430/17; 430/18; 430/20; 430/944; 430/945; 428/1
[58] Field of Search ................ 430/20, 945, 944, 11, 430/17, 18; 428/1

[56] References Cited

U.S. PATENT DOCUMENTS 4,637,896 1/1987 Shannon .......................... 428/1 X

FOREIGN PATENT DOCUMENTS 0897871 1/1984 Belgium .
2132623 7/1984 United Kingdom .

OTHER PUBLICATIONS

Kim Bergheim et al., "Lasers Enhance Mass Storage: Optical Disks are About to Bring a New Technology into Common Use", *Infoworld*, Jun. 25, 1984, pp. 40–45.
Richard Cunningham, "Erasable Optical Storage Moves Forward: Erasability is the Next Key Millstone, in Optical Data Storage"; Lasers and Applications, May 1984, pp. 109–112.
Robert Hirshon, "Optical Storage Meets Increased Data Demands", *Electronic Imaging*, Mar. 1984, pages unknown.
John Robinson, "Optical Disks Offer High-Volume Alternatives to Traditional Peripherals", *Computer Technology Review*, Fall 1984, pages unknown.
Masud Mansuripur, "Technology Trends: Disk Storage: Magneto-Optics Leads the Way", *Photonics SPECTRA*, Oct. 1984, pp. 59–62.
Edward S. Rothchild, "Optical Memory: Data Storage by Laser", *Byte*, Oct. 1984, pp. 215–224.
Albert R. Tebo, "Optical Recording and Storage Media" *Electro-Optics*, Mar., 1983, pp. 30–34.
Martin Marshall, "Optical Disks Excite Industry", *Electronics*, May 5, 1981, pp. 97–102.
Di Chen, "Overview of Commercially Available Optical Data Storage Technology Provided at OSA/IEEE Meeting" *Laser Focus/Electro-Optics*, Aug. 1984, pp. 42–48.
J. Timothy Riordan, "Optical Data Storage: Media is the Answer", *Photonics Spectra*, Jul. 1984, pp. 45–51.

*Primary Examiner*—Paul R. Michl
*Assistant Examiner*—Cynthia Hamilton

[57] ABSTRACT

The present invention relates to a process for optical storage which utilizes a photopolymerizable liquid crystalline material having cholesteric optical properties. By selectively adjusting the reflectance or transmittance properties of the recording medium such that specific wavelength bands of light are reflected or transmitted, and then substantially permanently fixing the reflectance or transmittance characteristics of the film by photopolymerization, multiple wavelength-dependent information can be stored in each dot. Accordingly, the capacity of the recording medium is substantially expanded when compared to conventional optical storage media.

12 Claims, 3 Drawing Sheets

OPTICAL STORAGE SYSTEM HAVING EXPANDED CAPACITY

The present invention relates to information storage, and more particularly to optical information storage.

With the expanded use of computers and audio and video systems, among others, information storage has increasingly become a problem because of the vast amounts of information which must be stored. Information storage has conventionally been achieved using a variety of means primarily involving magnetic and photographic recording means. However, the amount of information that can be stored in a given surface area is severely limited with such systems. For that reason, artisans have searched for new ways of storing information whereby space could be more efficiently utilized.

In recent years, attention has turned to optical storage devices. With such devices, digital data are used to modulate a laser source so as to selectively record data points on the surface of a photoreactive material. For most optical storage devices, the laser source induces a permanent change in the material. Therefore, when a low-power reading laser is aimed at the surface of the material and the light which is selectively transmitted or reflected from the surface material is analyzed, often using a photo detector, the stored light pattern can be translated back into the original electronic signal. The primary advantage of using such systems is that substantially more information can be stored per unit area than is obtainable using magnetic or other means.

Several types of optical storage devices are currently being marketed or developed. One type is a bubble-forming optical memory. This type of system utilizes two layers of material: an overlying thin metal layer (such as gold/platinum) and an underlying heat-decomposable polymer layer. By focusing a laser at a point on the surface of the medium, the metal film can be caused to become soft and pliable. Simultaneously, the heat from the laser causes the underlying polymer to decompose under the focal point, thereby forming a gas bubble. The gas bubble affects the contour of the soft and pliable surface and is retained when the surface cools. Thus, the presence or absence of a bubble at a given point on the surface constitutes a bit (a binary digit) of information.

A second type of optical recording means is ablative recording. In such a system, the laser burns a hole through a reflective surface to expose a non-reflective underlying surface. Conversely, a hole can be burnt through a non-reflective surface to expose an underlying reflective surface. In either event, the presence or absence of a hole results in the storage of a bit of information.

A third type of optical storage utilizes a crystalline/amorphous phase change in which the laser induces the medium, which is reflective or non-reflective, to change from one phase to another in which the new phase is either non-reflective or reflective, respectively. Similarly, this type of phase change may also be used in a refined manner such that the phase change occurs at one wavelength of light; thus, the phase change is wavelength dependent.

A fourth type of storage is magneto-optic recording, which is a combination of magnetic storage and optical storage that is often referred to as "optically assisted magnetic recording." Two systems are available, both of which use heat to selectively reverse the magnetic field of data points in the medium such that the field reversal rotates the plane of an incident polarized laser beam. Both the magneto-optical and crystalline/amorphous phase change materials offer the possibility of erasure.

Although these optical storage systems offer advantages over other conventional recording systems, they are not entirely satisfactory. Some of the recording media are stable only for a finite period of time; thus, they may not be suitable to provide permanent records. In addition, even though substantially more information can be recorded than with a magnetic recording system, the processes which are used are restricted to recording a single bit of information in each dot; i.e., the dot is either present or absent as indicated by the presence or absence of a hole, or by the presence or absence of a defined reflectance or transmittance characteristic. Thus, each dot is limited to the recording of a "yes" or "no" bit of information.

Accordingly, one objective of the present invention is to provide a process whereby multiple pieces of information (i.e., more than one binary digit) may be recorded in a single information dot.

Another objective of the present invention is to provide optical storage media in which the information which is stored is substantially permanently fixed.

These and other advantages of the present invention will become apparent from the detailed description of preferred embodiments which follows.

SUMMARY OF THE INVENTION

The present invention relates to a process for optical storage which utilizes a photopolymerizable liquid crystalline material having cholesteric optical properties. By selectively adjusting the reflectance or transmittance properties of the recording medium such that specific wavelength bands of light are reflected or transmitted, and then substantially permanently fixing the reflectance or transmittance characteristics of the film by photopolymerization, multiple wavelength-dependent information can be stored in each dot. Accordingly, the capacity of the recording medium is substantially expanded when compared to conventional optical storage media.

DETAILED DESCRIPTION OF PREFERRED EMBODIMENTS

In one embodiment, the present invention relates to a process for optically storing information, said process comprising the steps of providing a coating comprising a photoinitiator and a photopolymerizable liquid crystalline material on a support surface, said coating exhibiting cholesteric optical properties which may be adjusted to selectively transmit or reflect desired wavelength bands of light; sequentially adjusting said properties for a plurality of regions of said coating such that each said region transmits or reflects a selected wavelength band; and photopolymerizing each said region, whereby each region substantially permanently selectively transmits or reflects its selected wavelength band and said regions collectively comprise stored data.

In a second embodiment, the present invention relates to a process for optically storing information, said process comprising the steps of providing a coating comprising a photoinitiator and a photopolymerizable liquid crystalline material on a support surface, said coating exhibiting cholesteric optical properties which may be adjusted to selectively transmit or reflect desired wavelength bands of light; sequentially exposing a plurality of regions of said coating to an energy source whereby each said region is adjusted to selectively transmit or reflect a desired wavelength band of light; and sequentially exposing each said region to a photopolymerizing energy source, whereby each region is photopolymerized so as to substantially permanently selectively transmit or reflect said wavelength band, said photopolymerized regions collectively comprising stored data.

In a third embodiment, the present invention relates to a process for reading an optical data storage medium comprising a photopolymerized cholesteric liquid crystalline material, said process comprising the steps of providing a medium comprising a plurality of regions comprising a photopolymerized cholesteric liquid crystalline material, each said region selectively transmitting or reflecting a wavelength band of light; sequentially irradiating each said region with a non-destructive light source comprising said wavelength bands; and sequentially detecting at least a portion of the reflected or transmitted light from each said region, said wavelength bands collectively comprising stored data.

In a fourth embodiment, the present invention comprises an optical data storage system comprising a data-modulated energy beam, a photopolymerizing laser beam, a non-erasing reading light beam comprising a plurality of wavelengths, a photodetecting means capable of detecting selected wavelength bands, and a layer of an optical storage medium comprising a photopolymerizable liquid crystalline material and a photoinitiator, said medium possessing cholesteric optical liquid crystalline properties which are adjustable by exposure to said energy beam whereby said medium selectively transmits or reflects selected wavelength bands of light, said medium further being photopolymerizable by said laser beam so as to permanently fix said selected wavelength bands.

In a fifth embodiment, the present invention comprises an optical data recording system, said system comprising an optical recording medium, said medium comprising a photopolymerizable liquid crystalline material possessing cholesteric optical properties and a photoinitiator; data recording means, said means comprising a data-modulated energy beam and a photopolymerizing laser beam, said means further comprising means for focusing said energy beam and said laser beam at selected regions on said medium; and means for providing relative movement between said medium and said focused energy and laser beams, said energy beam being capable of selectively adjusting the transmitted or reflected wavelength bands of light of selected regions of said medium and said laser beam being capable of subsequently photopolymerizing said medium whereby said medium substantially permanently transmits or reflects said selected wavelength bands.

In a sixth embodiment, the present invention comprises a medium comprising optically stored data, said medium being obtained from a photopolymerizable liquid crystalline material possessing cholesteric optical properties and a photoinitiator on a support surface, said medium comprising a plurality of regions wherein said liquid crystalline material is polymerized and, optionally, regions wherein said liquid crystalline material is unpolymerized, said polymerized regions selectively transmitting or reflecting selected wavelength bands of light, said polymerized regions and said optional unpolymerized regions collectively comprising stored data.

The optical storage medium which will be used to practice the present invention will comprise a photopolymerizable liquid crystalline material capable of demonstrating cholesteric optical properties. When provided in a properly aligned coating comprising a suitable photoinitiator, external influences may be exerted which will induce the material to reflect or transmit a desired wavelength band of light in the infrared, visible and/or ultraviolet regions of the spectrum. Examples of such influences are temperature, electrical fields, magnetic fields, pressure, sound waves, chemical vapors and the like. Nevertheless, depending on the environment in which the material is used, certain of these influences may be preferred over others. For the data recording and reading uses contemplated herein, electrical and magnetic force changes and temperature adjustments will be preferred, with temperature adjustments being most preferred. Once the appropriate wavelength band is attained, the material may be photopolymerized so as to fix the characteristics of the film. Thereafter, when the film is examined with a detector means, the fixed characteristic of the dot will be detectable. When photopolymerized, the medium will be remarkably stable and will retain its fixed optical characteristics for years, even under relatively adverse conditions. Thus, the media of the present invention are ideal as data recording materials.

Examples of materials which may be utilized to practice the present invention are those disclosed in U.S. application Ser. Nos. 450,088, 450,089, 660,278, and related applications, all of said applications being owned by the assignee of the present invention. The materials disclosed therein are cholesterol or dihydrocholesterol derivatives which are attached through the hydroxyl group at the 3-position to an acrylate or a methacrylate moiety by a spacer group. Thus, these compounds have the structure where $R_1=H$ or $CH_3$, $A=-R_2-$, $-R_3O-$ or $-R_4O-$, $R_2=$an alkylene chain having 3-14 methylene or lower alkyl substituted methylene groups, $R_3=$an alkylene chain having from 2-14 methylene or lower alkyl-substituted methylene groups, $R_4=$an alkylene or lower alkyl substituted alkylene ether, diether or triether having a total of from 3-14 carbon atoms in the alkylene moieties, provided that the terminal alkylene moiety adjacent the carbonate moiety comprises not less than two carbon atoms, and $y=0$ or 1. It will be understood, however, that the present invention may be practiced with any photopolymerizable liquid crystalline material whose cholesteric optical properties may be fixed by photopolymerization, and that the present invention is not restricted to those compositions disclosed in the aforementioned U.S. applications.

It will also be understood that, in many instances, it will be preferred to practice the present invention wherein the cholesteric liquid crystalline material is utilized in a composition which comprises other components, such as other photopolymerizable or non-photopolymerizable liquid crystalline materials, monomeric diluents, stabilizers, and the like. In particular, it has been noted with certain liquid crystalline materials that the inclusion of a limited amount of monomeric diluent may cause a viscosity decrease such that the materials are easier to obtain as thin, sheared, highly aligned coatings. As will be explained in more detail below, the thickness of the coating is often an important consideration. For these and other reasons, all of the aforementioned combinations are deemed to be within the scope of the present invention.

The photopolymerizable compositions may be utilized on a variety of support surfaces, such as by spreading them as a film on a support surface which is entirely smooth and uniform, or by spreading them according to known specialized techniques on a pregrooved spiral or concentric track surface, such as those disclosed in U.S. Pat. No. 4,298,975. Once the medium is disposed on the support surface, the object will be to irradiate a selected region, also referred to herein as an information dot, such that the region or dot either reflects or transmits a desired wavelength or plurality of wavelengths of light. Ideally, the medium would be adjusted such that each dot transmitted or reflected a selected wavelength of light; however, in most circumstances, it will not be possible to fix a single wavelength response because of the difficulty in compelling all portions of the medium to simultaneously exhibit the same response. For this reason, the term "wavelength band" is used herein to describe the response of the film, and this term will be deemed to include one or more contiguous wavelengths of light which are transmitted or reflected by a medium of the present invention.

Film thickness and molecular alignment are important considerations which can affect the number of wavelengths in a given wavelength band. As the film thickness increases and the degree of molecular alignment decreases, the band width of the transmitted or reflected light will tend to increase. The increase in thickness may adversely affect the ability of the film to be fixed by the photopolymerizing radiation; thus, some parts of the film may polymerize at different rates, and variable optical responses may be found in different parts of the film.

For these reasons, a film thickness of not more than about 25 microns will usually be preferred, but more preferably the thickness will not be more than about 15 microns. On the other hand, too thin a film may also be undesirable. It has been reported that cholesteric liquid crystalline materials lose their cholesteric responses when film thicknesses are reduced to about 2-3 microns; thus, to practice the present invention, the film thickness should be not less than about 2 microns and preferably not less than about 3 microns, depending on the nature of the material.

Figure 1:
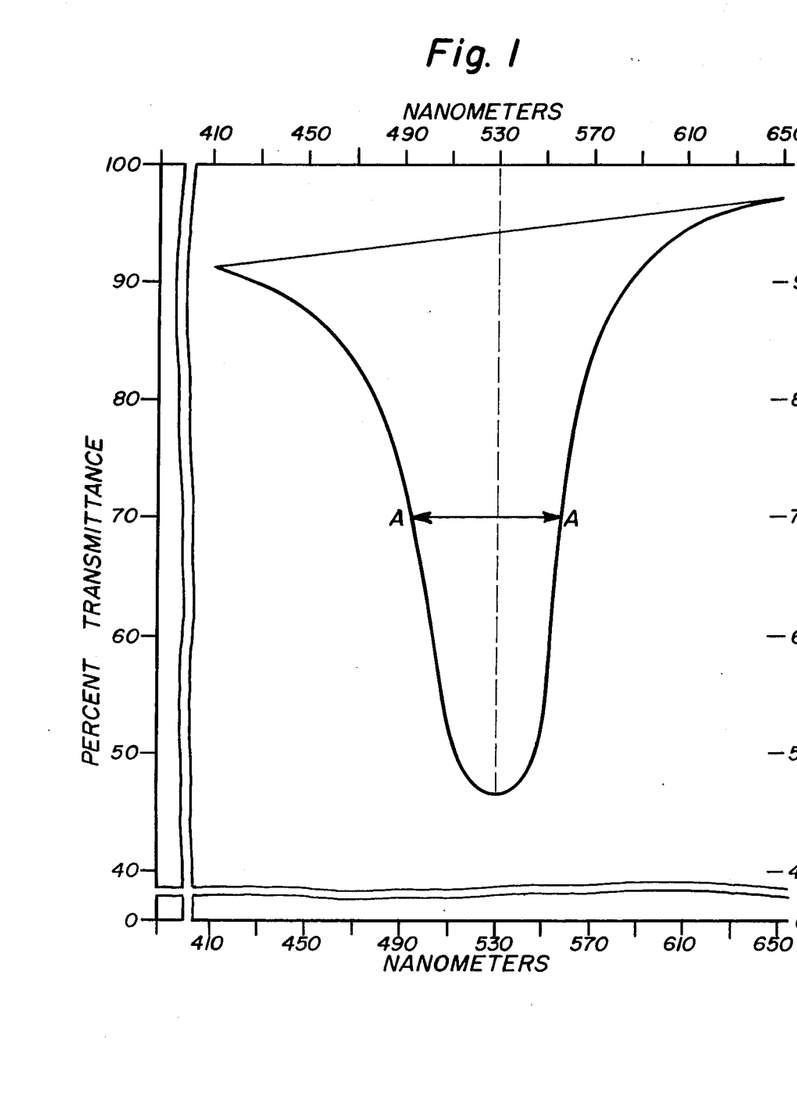
Figure 2:
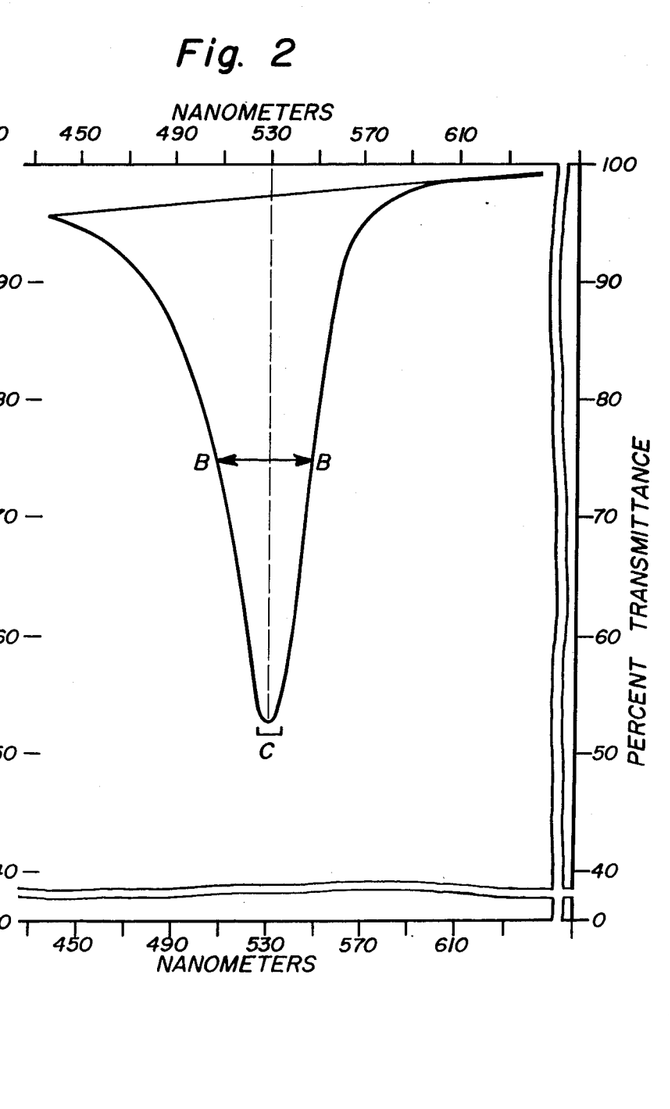

The responses of thick versus thin films may be seen by reference to FIGS. 1 and 2. FIG. 1 illustrates the optical transmission spectrum obtained from a film which was thick relative to that which provided the optical transmission spectrum illustrated in FIG. 2, and the peak width at half height is substantially wider. This increased width decreases the number of wavelength bands which may be recorded in a given type of medium because the bands must be spread farther apart in order to avoid serious overlapping interferences. Although interference problems may be minimized by using reading detectors which can be adjusted such that they detect responses having a minimum peak height and which may also be adjusted such that they detect responses from a limited portion of the wavelength band (preferably the peak maximum), it is nevertheless preferable to obtain narrow responses in order to maximize the recording efficiency of the medium. As another alternative, detection may also be accomplished by obtaining by integration the areas under the peaks which correspond to the respective wavelength bands.

As previously indicated, the most preferred way of practicing the present invention will be by thermally adjusting the characteristics of the film, and this may be accomplished through the external application of energy. One way this may be achieved is by focusing a beam of infrared light on a selected region of the medium (a dot) so as to increase the temperature of the material. As the selected portion of the medium is adjusted by heating, the transmitted or reflected wavelength of light will change. Therefore, irradiation should continue until such time as the information dot actually reflects or transmits the desired wavelength band. This may be determined by an actual measurement or by predetermining the amount of energy necessary to irradiate the dot to achieve the necessary increase in temperature from a known starting temperature. In either event, when the desired wavelength of transmittance or reflectance is attained, the dot will immediately be photopolymerized so as to fix its optical properties.

The present invention offers a variety of advantages over the prior art devices, one of which pertains to highly accurate recording. With prior art devices, the information dots are first fixed and then reviewed for accuracy. If a mistake is found, the information must be rerecorded, a process which occupies additional space on the recording medium and also wastes time. With the present invention this may be avoided because the transmitted or reflected characteristics may be adjusted by either of the aforementioned means, and the characteristics may then be verified before photopolymerization occurs. Adjustments in the transmittance or reflectance may be made before photopolymerization; thus, redundancy and the space required for error correction can be minimized, further increasing the usable area of the medium.

The information stored in a sequence of dots may be read by irradiating the surface of the polymerized medium with a non-destructive light source which comprises all of the wavelength bands that are stored in the medium. Each dot will selectively reflect or transmit the wavelength band according to its fixed character, and the reflected or transmitted light can be scanned by an appropriate photodetector. As previously indicated, the detector may be adjusted such that it can detect the entire band width of the dot, or only a portion of the band width. FIG. 2 illustrates an arbitrary scanning width of ca 10 nm, as indicated by dimension C.

The foregoing discussion was directed to a medium in which each information dot constituted a discrete portion of the medium and wherein, in the usual circumstance, all portions of the medium would be polymerized. Nevertheless, systems may also be utilized wherein a given information dot is not polymerized, but instead remains unpolymerized such that it can transmit or reflect a variable wavelength band which does not correspond to the other assigned wavelength bands. In such a circumstance, the detector means would detect the absence of a signal and this lack of signal would have an assigned meaning in the manner of an assigned wavelength band. Although such a system would yield essentially the same result as that set forth above, it is preferable to utilize a system wherein all portions of the medium to be read are polymerized because such a system would minimize the opportunity for detecting misleading signals.

Another variation of this possibility would be where each discrete information dot was polymerized but was surrounded by small areas of unpolymerized material. Although this might be acceptable in some situations, it nevertheless offers the opportunity for undesirable relative movement between the information dots. In addition, lower molecular weight species might tend to migrate from the unpolymerized areas to the polymerized information dots, thereby causing a change in the optical properties of the dots. Therefore, it would be preferable to fix these surrounding regions by polymerizing them such that they exhibit no optical characteristics or they transmit or reflect a wavelength band of light which is invisible to the detector.

Another factor which should be considered when selecting the recording medium is the sensitivity of the recording and reading means. As is well known in the art, present day commercial apparatuses are capable of operating at high speed so as to rapidly and accurately fix a plurality of information dots. Ideally, the manufacturers of prior art optical recording devices now require that the material be sensitive enough to be affected by a 0.2-nanojoule exposure per square micrometer, and that each information dot be on the order of one micron, or less, in diameter. Nevertheless, high speed is not always critical, and data may be recorded at one speed and read at another speed.

The present invention may be utilized under a variety of conditions involving both high- and low-speed recording and reading, the selection of which will depend on the environment in which the medium is ultimately employed (e.g., personal computers versus high-speed commercial applications). This may be accomplished by matching the sensitivity characteristics of the film (including thickness, response characteristics, susceptibility to polymerization and the like) to the requirements for the recording and/or reading apparatus. All such variations are deemed to be within the scope of the present invention.

The advantages of practicing the present invention will be immediately apparent. In the prior art, only one bit of information could be recorded in a single dot. With the present invention, one bit or substantially more information may be encoded in a single dot. If an optical storage medium of the present invention is provided in which n distinguishable wavelength bands of light may be fixed, then, utilizing a binary based computer system, $2^n$ combinations will be possible. Thus, for example, four distinguishable wavelength bands will provide four ($2^2$) binary combinations: 00 01 10 11. If a specific wavelength is assigned to each of these combinations, then one of four colors (wavelength bands) could be fixed in each dot and two binary digits of information, as opposed to one binary digit for the prior art, could be recorded. Therefore, for this example, the amount of information would be doubled in comparison to that which would be recorded using a prior art device. If other than a binary system is utilized, different limitations will apply to the amount of information that may be stored.

Similarly, if eight ($2^3$) different wavelengths of light could be detected and fixed in the medium, the following combinations would be possible: 000 001 010 011 100 101 110 111. It will readily be seen that this combination of wavelength recordings offers the opportunity of obtaining three times the information which is stored in a single dot, as compared to the prior art. Accordingly, it will be apparent that the overall capacity of a recording medium to record information will be dependent upon the ability of the artisan to detect different recorded wavelengths. It will also be seen that, as the number of distinguishable wavelengths is increased, dramatic increases in storage capability will be obtained. As a matter of practical limitation, however, if a medium of the present invention were capable of reflecting or transmitting light wavelengths ranging from 200 to 1,000 nm, and if the detector means were capable of distinguishing 10-nm wavelength bands, 80 possible bands could be distinguished. Assuming that a binary system was being used, a maximum of $2^6$ (i.e., 64) wavelength bands could be used to record data. Of course, this would require an extremely high performance capability and, considered in practical terms, probably not more than 32 ($2^5$) bands would be used.

The improved storage capability of the present invention may also be visualized in a different manner. Thus, if the letter A, for which the ASCII code is 65 (01000001 in binary), is stored on a conventional prior art recording medium, eight grouped dots would be required to record this letter. With the present invention, utilizing a simple recording medium capable of detecting four distinguishable light wavelength bands as described above, the same information could be stored in four information dots. As explained above, this is a doubling of the storage capacity.

The present invention offers a manner of storage which, in some respects, is the inverse of that known in the prior art. Thus, some computers have built into their operating systems a means for representing different colors on a CRT display as defined by combinations of binary digits. For example, if the computer were capable of recognizing 16 colors, 16 different combinations ($2^4$) of 0's and 1's would be required to encode the information. Thus, if the color green were assigned a code of 0001, which is 1 of 16 possible variations of four binary digits, the computer would order the display of the color green in response to this code. With the present invention, the reverse is true because the computer would be programmed to generate a binary code in response to a particular color. Accordingly, in the above example, the computer would respond to the color green by generating the code sequence 0001.

From the foregoing, it will be immediately apparent that the present invention offers the opportunity of storing substantially more information in a single dot than is possible for a prior art medium. One of a plurality of wavelength bands having assigned meaning according to the detector code may be fixed in a given dot and, when detected and interpreted, preferably by computer means, the assigned meaning will be readily determinable. Rather than merely seeing the presence or absence of a dot, the detector means can see one of a multitude of assigned wavelength bands having a fixed meaning. Further, this information may be provided in a variety of media such as discs, cards, tapes, film, slides, and the like, with or without protective sheathings or coatings, and all such media are deemed to be within the scope of the present invention. The information may also be recorded over a wide portion of the light spectrum, including the UV, visible and IR regions of the spectrum, and the information may be recorded at one time or sequentially over a period of time, provided that the unused regions of the medium remain unpolymerized.

In view of the many choices of wavelength bands that could be provided for an information dot, substantially higher information density can be provided. For example, current magnetic recording devices can record about $1.6 \times 10^6$ bits of information per square centimeter, and optical storage devices utilizing 1-micron recording dots can record about $10^8$ bits per square centimeter. A simple four-color response according to the present invention and utilizing 1-micron dots will be capable of recording $2 \times 10^8$ bits of information per square centimeter, and increasing the number of colors to 8, 16 and so on dramatically increases the storage capability of the selected medium. Accordingly, the potential capacity of the present system far exceeds that presently known in the art.

The advantages and disadvantages of practicing the present invention will become more clearly understood from the examples which follows, said examples being provided by way of illustration and not limitation.

EXAMPLES

The cholesteric liquid crystalline materials utilized herein were prepared essentially as described in U.S. application Ser. No. 489,088.

EXAMPLE 1

This example will illustrate a relatively simple process for fixing a single transmitted wavelength band of an optical recording medium of the present invention. One drop (ca. 0.02 g) of a composition comprising 48 percent by weight of dihydrocholesteryl 4-acryloyloxy butanoate, 48 percent dihydrocholesteryl 11-acryloyloxy undecanoate, 3 percent pentaerythritol triacrylate comonomer and 1 percent Irgacure 651 photoinitiator is placed on a transparent glass microscope slide. A 6.5-mil thick transparent glass cover slide is placed on top of the drop and pressed down to make a 1 to 1.5-mil thick sheared liquid crystalline film sandwiched between the two pieces of glass. The sample is mounted in a position normal to the beam of an infrared light source focused down to 20 mm². In addition, a pulsed UV laser which emits at 337 nm is similarly focused on the same spot. The sample is irradiated at room temperature with the infrared light until the transmitted light of the film has a wavelength of ca. 500 to 530 nm. The spot is immediately irradiated with the pulsed UV laser, thereby polymerizing the spot and fixing the transmission characteristics of the film. A visible transmission spectrum of the polymerized spot produces a peak in the 500-530 nm region.

EXAMPLE 2

This example will illustrate the effect of film thickness and shear on the half height band width. One drop (ca.0.02 g) of a composition containing 48 percent by weight of dihydrocholesteryl 4-acryloyloxy butanoate, 48 percent dihydrocholesteryl 11-acryloyloxy undecanoate, 3 percent pentaerythritol triacrylate and 1 percent Irgacure 651 is placed on each of two transparent glass microscope slides. A second microscope slide is placed on top of each drop. For example 2A, the slides are pressed together by hand to provide sufficient shear so that a cholesteric response is visible. For example 2B, the microscope slides are tightly clamped together on each end to produce the thinnest and most highly sheared film possible under these conditions, the material also exhibiting a cholesteric response. The two samples are exposed to the same temperature conditions, and each is irradiated with a xenon UV arc lamp such that each spot is exposed to 24 joules of energy. The resulting transmission spectrum for each of these samples is shown in FIGS. 1 and 2, respectively. These results show that the band width at half peak height (A—A in FIG. 1) is ca. 65 nm whereas the width of the narrower peak (B—B in FIG. 2) is ca. 40 nm. The respective film thicknesses are about 37 microns and 13 microns for the samples used to provide these two figures. Accordingly, the thicker the film and the lesser the degree of the alignment, the broader the peak width which will be obtained.

EXAMPLE 3

This example will illustrate temperature adjustments which result in different wavelength band responses for a given medium. One drop (ca.0.02 g) of a composition containing 19.2 percnt by weight of dihydrocholesteryl 4-methacryloyloxy butanoate, 76.8 percent dihydrocholesteryl 11-methacryloyloxy undecanoate, 3.0 percent pentaerythritol triacrylate and 1.0 percent Irgacure 651 photoinitiator is placed on each of a series of transparent glass slides. Over each drop is placed a second microscope slide and each slide pair is pressed together to induce shear in the liquid crystalline film. Each of the samples is then subjected to a different external temperature ranging from 5° to 43° C. such that each provides a different cholesteric response. Each response is then fixed by exposure to a xenon UV arc lamp as described in Example 2. The respective temperatures at which polymerization is effected and the resulting transmission data are as follows:

| Sample | Temperature (°C.) | λmax |
|--------|-------------------|------|
| 3A | 5 | 850 |
| 3B | 10 | 620 |
| 3C | 15 | 575 |
| 3D | 25 | 470 |
| 3E | 43 | 427 |

Figure 3:
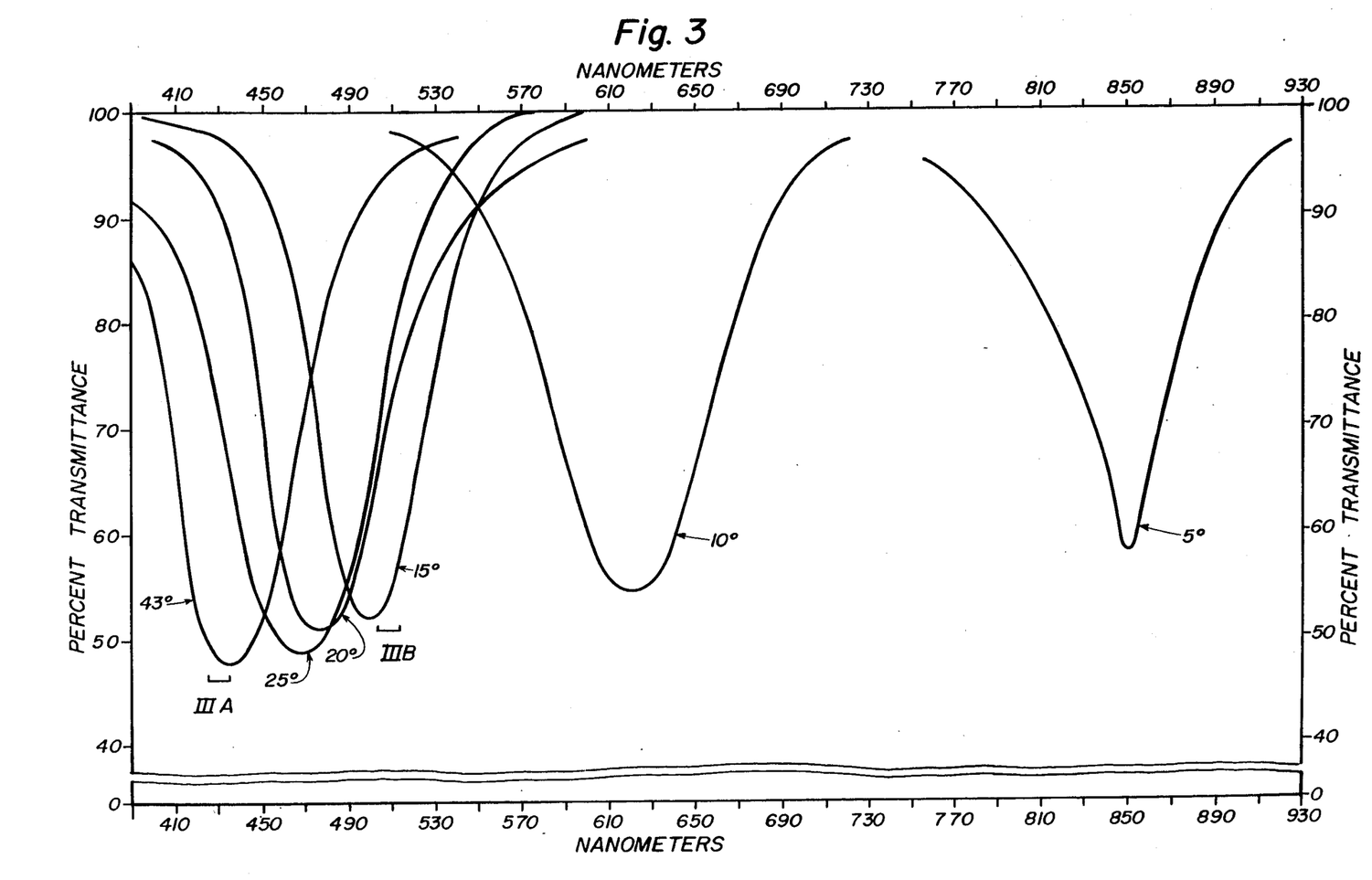

The series of spectra which is obtained is illustrated in FIG. 3. It is seen that the 15°, 20°, 25° and 43° peaks are close together, and that the 20° and 25° peaks probably cannot be distinguished unless integrative techniques are used. Nevertheless, the 43° peak may be distinguished from the 25° peak, and the 15° peak may be distinguished from the 20° peak, by selecting a minimum 60% transmittance limit, and by scanning narrow wavelength regions IIIA and IIIB, as indicated. These spectra also indicate that linear changes in temperature may not produce linear shifts in the peak height maxima.

EXAMPLE 4

This example illustrates the production and detection of four attenuation wavelength bands of light for use in a simple optical recording device. A film sample is prepared as indicated in Example 1 and the film is mounted in a holder. By means of a circulating fluid, the film temperature is adjusted to 0° C. The holder maintains the position of the sample so that it is normal to a beam of infrared light which is focused to a dot having an area of 1 mm$^2$. A pulsed UV laser emitting at 337 nm is similarly focused on the same dot. The holder also permits movement of the sample so that the point of focus upon the sample may be sequentially changed from one location to another.

A first dot on the sample is irradiated by the infrared light beam for a period of time such that the dot attenuates wavelengths in a band ranging from 400 to 430 nm. The dot is immediately irradiated by the UV laser, thereby permanently fixing the optical attenuation characteristics of the film. The sample holder is immediately adjusted such that a second dot adjacent the first is moved such that it is exposed to the infrared energy source and the infrared and UV light beams are applied in the same manner; however, in this instance, the time of exposure to the infrared source is altered such that the attenuated wavelength band for the dot is from 470 to 510 nm. As with the first dot, the second dot is also immediately irradiated by the UV laser to induce polymerization and to fix the optical transmittance characteristics of the dot.

This process is repeated two additional times, except that the attenuated wavelength band of the third dot is from 500 to 540 nm, and the attenuated wavelength of the fourth dot is from 580 to 610 nm. Thus, four sequential dots are obtained, each having a different wavelength transmission characteristic.

Figure 4:
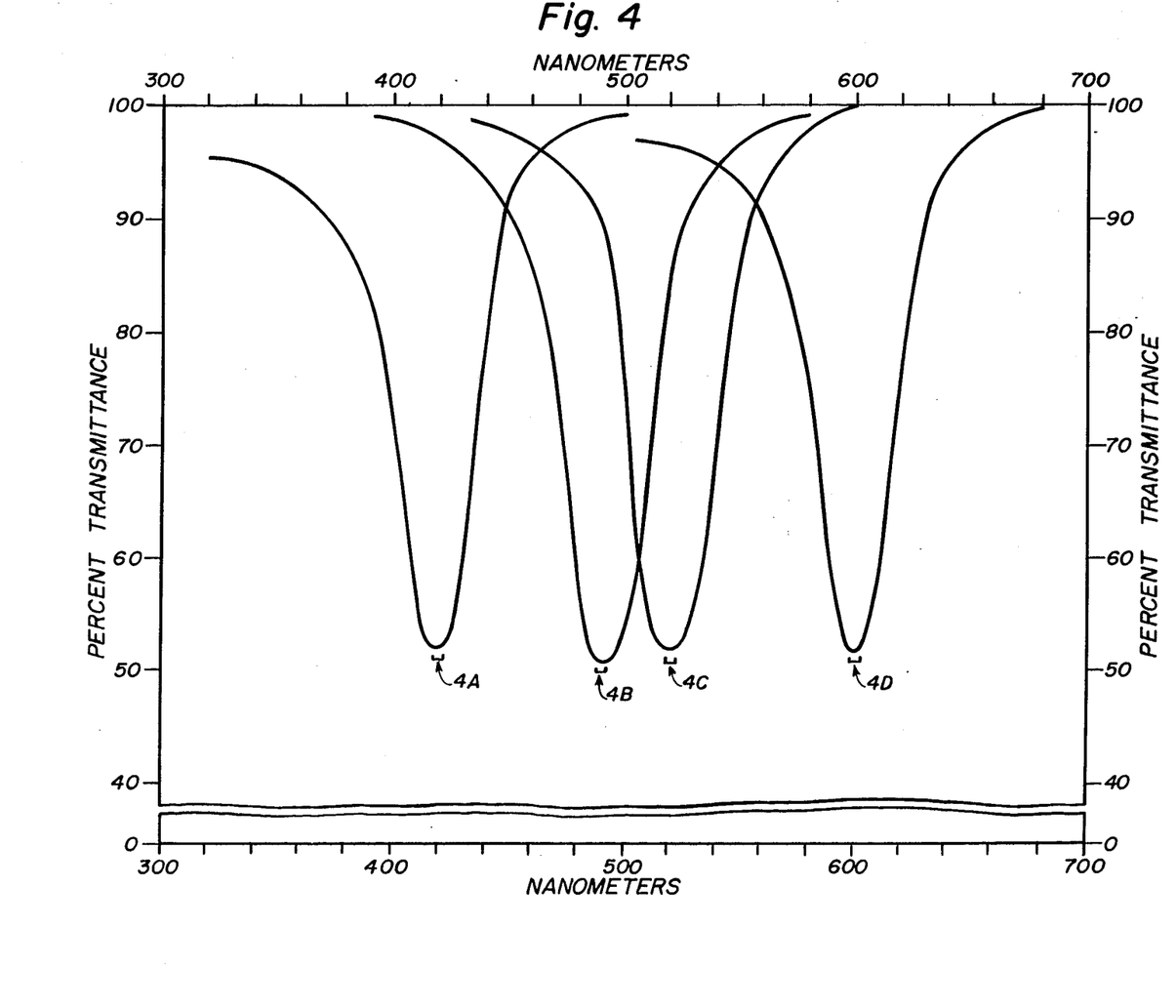

Detection and discrimination between the dots is achieved by focusing a beam of light from a tungsten lamp on each dot. The light transmitted by each of the dots is passed through a monochromator which analyzes the transmitted light in the following wavelength ranges: 417–421 nm; 488–492 nm; 518–522 nm; and 598–602 nm, as indicated by 4A–4D of FIG. 4. The light from the monochromator is allowed to fall on a photomultiplier tube equipped with suitable electronic circuitry to detect and record the monochromator output, the circuitry having additional means for differentiating between strong signals (minimum 60% transmission) and background signals which would be obtained from background noise or band overlap. The particular wavelength range in which each dot attenuates the light from the tungsten lamp is indicated by a low output from the photomultiplier tube. Accordingly, dots with different information content can be detected by the differing responses of the analyzer, which comprises the monochromator, the photomultiplier tube and the associated electronic circuitry. The resulting spectra and the areas of detection are illustrated in FIG. 4.

EXAMPLE 5

This example illustrates the use of four distinct attenuation wavelength bands to encode information in an optical recording material of the present invention. Each of the four wavelengths ranges obtained according to Example 4 are assigned the following bit pair values:

| Sample | Wavelength Range | Bit Pair Assignment |
|--------|------------------|---------------------|
| 4A | 417–421 | 00 |
| 4B | 488–492 | 01 |
| 4C | 518–522 | 10 |
| 4D | 598–602 | 11 |

Byte values are determined by reading a sequence of four dots. Thus, if the sequence detected is dot 1 (488–492 nm); dot 2 (417–421 nm); dot 3 (417–421 nm); and dot 4 (488–492 nm), the byte value is 01000001. This byte value is 65, which corresponds to the ASCII code for the letter A.

Alternatively, if the sequence is as follows—dot 1 (488–492 nm); dot 2 (488–492 nm); dot 3 (518–522 nm); and dot 4 (518–522 nm), the byte value is 01011010. This is 90. which corresponds to the ASCII code for the letter Z. Accordingly, it will be seen that by appropriately recording sequences of dots having selected wavelength band responses, approximately twice (for this example) the information can be recorded in a sequence as can be recorded by prior art devices.

The present invention is not limited to the descriptions and illustrations set forth above, but encompasses all modifications envisaged by the following claims.

What is claimed is:

1. A medium comprising optically stored data, said medium being obtained from a photopolymerizable liquid crystalline material possessing cholesteric optical properties and a photoinitiator on a support surface, said medium comprising a plurality of regions wherein said liquid crystalline material is polmerized, said polymerized regions being in the form of dots of about one micron in size, said dots being arranged in plural sequence of dots, each sequence being at least four dots forming means capable of selectively transmitting or reflecting selected wavelength bands of light to provide from one to four different colors per sequence of four dots, said polymerized regions in each said four dot sequence being means collectively comprising stored data with each color per sequence representing a different piece of information.

2. The invention as set forth in claim 1 hereof wherein each dot by its color represents one-fourth of an ASCII number and the sequence of four dots representing the full ASCII number.

3. The invention as set forth in claim 2 hereof wherein there are $2^n$ distinguishable wavelength bands, n being an integer from 1 to 5.

4. The invention as set forth in claim 2 hereof wherein at least one of said photopolymerized regions reflects a wavelength band comprising visible light.

5. The invention as set forth in claim 2 hereof wherein at least one of said photopolymerized regions reflects a wavelength band comprising infrared light.

6. The invention as set forth in claim 2 hereof wherein at least one of said photopolymerized regions reflects a wavelength band comprising ultraviolet light.

7. The invention as set forth in claim 2 hereof wherein at least one of said photopolymerized regions transmits a wavelength band comprising visible light.

8. The invention as set forth in claim 2 hereof wherein at least one of said photopolymerized regions transmits a wavelength band comprising infrared light.

9. The invention as set forth in claim 2 hereof wherein at least one of said photopolymerized regions transmits a wavelength band comprising ultraviolet light.

10. The invention as set forth in claim 2 hereof wherein said coating has a thickness of from about 2 to about 25 microns.

11. The invention as set forth in claim 10 hereof wherein said thickness is preferably from about 3 to about 15 microns.

12. The invention as set forth in claim 2 hereof wherein said liquid crystalline material has the structure where $R_1=H$ or $CH_3$, $A=-R_2-$, $-R_3O-$ or $-R_4O-$, $R_2=$ an alkylene chain having 3–14 methylene or lower alkyl substituted methylene groups, $R_3=$ an alkylene chain having from 2–14 methylene or lower alkyl-substituted methylene groups, $R_4=$ an alkylene or lower alkyl substituted alkylene ether, diether or triether having a total of from 3–14 carbon atoms in the alkylene moieties, provided that the terminal alkylene moiety adjacent the carbonate moiety comprises not less than two carbon atoms, and $y=0$ or $1$.

* * * * *